United States Patent
Narayanan et al.

(10) Patent No.: US 7,042,922 B2
(45) Date of Patent: May 9, 2006

(54) METHOD FOR CALIBRATING PHOTONIC CROSSCONNECT DEVICE

(75) Inventors: Babu Narayanan, San Jose, CA (US); Yong-Qin Chen, San Jose, CA (US); Robert Ward, St. Charles, IL (US); Rani Indaheng, San Jose, CA (US); Humair Raza, Sunnyvale, CA (US)

(73) Assignee: Nortel Networks, Ltd., St. Laurent (CA)

( * ) Notice: Subject to any disclaimer, the term of this patent is extended or adjusted under 35 U.S.C. 154(b) by 404 days.

(21) Appl. No.: 10/384,270

(22) Filed: Mar. 7, 2003

(65) Prior Publication Data

US 2004/0071391 A1  Apr. 15, 2004

Related U.S. Application Data

(60) Provisional application No. 60/368,276, filed on Mar. 27, 2002.

(51) Int. Cl.
*H01S 3/08* (2006.01)

(52) U.S. Cl. .................... 372/103; 372/107
(58) Field of Classification Search .......... 372/107, 372/5, 103; 385/18, 17
See application file for complete search history.

(56) References Cited

U.S. PATENT DOCUMENTS 4,998,260 A * 3/1991 Taniura ............... 372/107
2002/0076136 A1* 6/2002 Ducellier et al. .......... 385/17

OTHER PUBLICATIONS

Copy of International Search Report from counterpart foreign application PCT/US03/07315.

* cited by examiner

*Primary Examiner*—Minsun Oh Harvey
*Assistant Examiner*—Dung Nguyen
(74) *Attorney, Agent, or Firm*—John C. Gorecki

(57) ABSTRACT

A method for calibrating a preferred disposition for a moveable first mirror of an optical switch core of a photonic crossconnect device relative to a second mirror thereof, the method comprising the steps of determining approximate geometric coordinates of the first mirror relative to the second mirror, effecting a laser light crossconnection between the first and second mirrors to produce data from which to provide first order corrections to refine the geometric coordinates, and effecting a further laser light crossconnection between the first mirror and a third mirror, to produce data from which to provide second order corrections to further refine the geometric coordinates, whereby to calibrate the first mirror such that upon initiation of a laser light crossconnection involving the first mirror, a switching element detects deviation of the first mirror from the preferred disposition thereof and effects corrective changes.

6 Claims, 3 Drawing Sheets

METHOD FOR CALIBRATING PHOTONIC CROSSCONNECT DEVICE

REFERENCE TO RELATED APPLICATION

This application claims the benefit of now abandoned prior U.S. Provisional Patent Application Ser. No. 60/368,276, filed Mar. 27, 2002 by Babu Narayanan et al. for CALIBRATION OF PHOTONIC CROSSCONNECTS, which patent application is hereby incorporated herein by reference.

FIELD OF THE INVENTION

This invention relates to automatic precise alignment of laser light transmitting and receiving mirrors, and is directed more particularly to alignment of mirrors in an optical switch core of a photonic crossconnect device.

BACKGROUND OF THE INVENTION

Photonic crossconnect devices (PXCs) are generally known and comprise an optical crossconnect with no optical-electrical conversions performed in the data path in the device. The typical crossconnect device includes a plurality of input ports, a plurality of output ports, and an optical switch core which provides relative connections between input and output ports. The optical switch core itself typically comprises, among other things, electrostatically controlled microelectromechanical (MEMs) mirrors which are tilted on command so as to direct optical signals between various ports. However, manufacturing variations and changes on operating environments require that photonic crossconnect devices be calibrated so as to ensure the reliable operation of the devices.

There is a need for a method for calibration of the optical switch core (or cores) of the PXC so that crossconnections can be made quickly and reliably.

SUMMARY OF THE INVENTION

An object of the invention is, therefore, to provide a method for calibrating the switching elements of a photonic crossconnect device such that crossconnections can be effected quickly and reliably.

With the above and other objects in view, a feature of the present invention is the provision of a method for calibrating a most efficient disposition for a first mirror of a first switching element of an optical switch core of a photonic crossconnect device relative to a second mirror of a second switching element of the optical switch core, the first element first mirror being moveably mounted relative to the optical switch core, and first switching element sensors being mounted on the first switching element for sensing (i) geometrical coordinates of the first mirror in space, (ii) offset values for the first switching element sensors, and (iii) gain values for the first switching element sensors. The method comprises the steps of setting offset and gain values for the first switching element sensors of the first switching element to default values, and determining approximate first order geometric coordinates of the first mirror of the first switching element relative to the second mirror of the second switching element by at least one of (i) heuristics and (ii) mathematics. The method further comprises the steps of effecting a laser light crossconnection between the switching elements' first and second mirrors. Data is provided therefrom that is used to refine the first order geometrical coordinates of the first mirror of the first switching element, and effecting at least one further laser light crossconnection between the first switching element, first mirror and a third switching element third mirror. Data is produced therefrom that is used to correct the offset and gain values for the first switching element sensors, whereby to calibrate the first mirror such that upon initiation of a laser light crossconnection involving the first mirror, the switching element sensors for the first switching element are adapted to detect deviation of the first mirror from the most efficient disposition thereof and enable the first switching element to effect corrective changes.

The above and other features of the invention, including various novel details of construction and combinations of parts and steps, will now be more particularly described with reference to the accompanying drawings and pointed out the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DETAILED DESCRIPTION OF THE EMBODIMENTS

Figure 1:
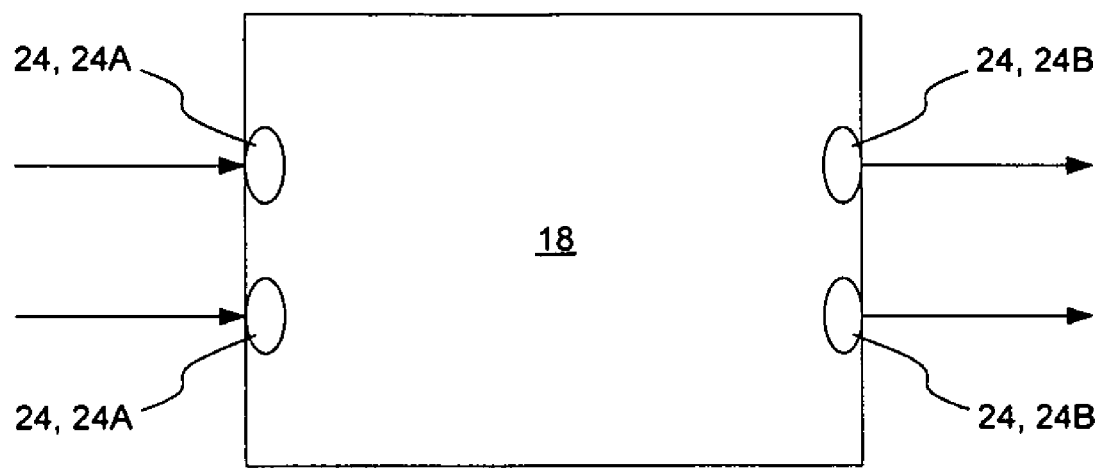
FIG. 1 is a diagrammatic illustration of an optical switch core for a photonic crossconnect device.
Figure 2:
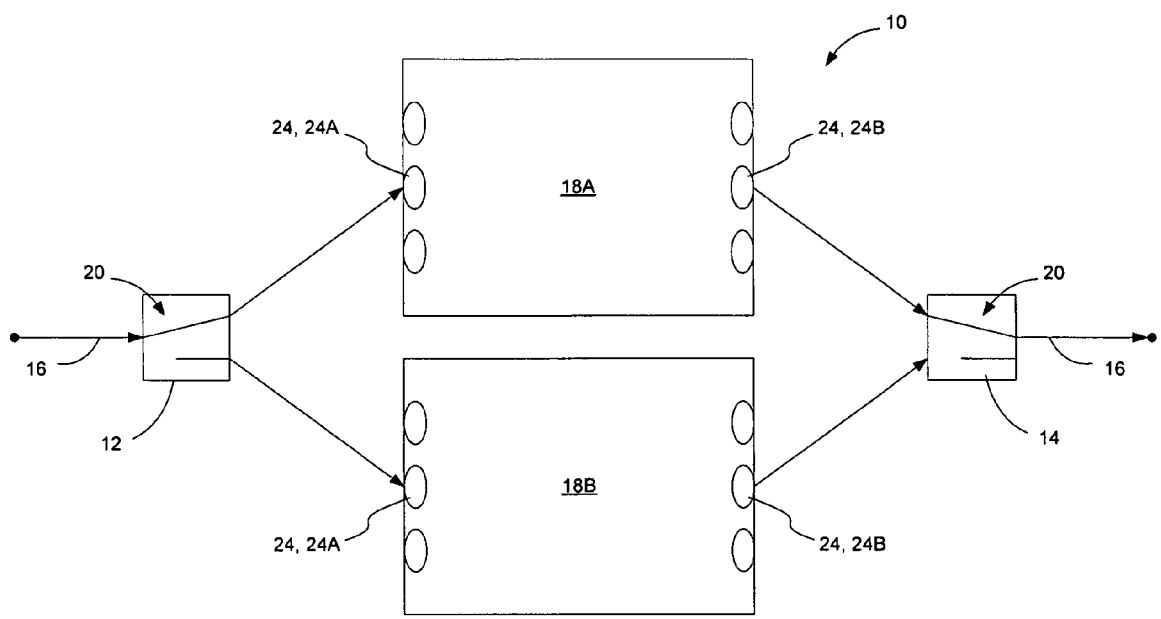
FIG. 2 is a diagrammatic illustration of a photonic crossconnect device having optical switch cores, each having an array of switching elements.
Figure 3:
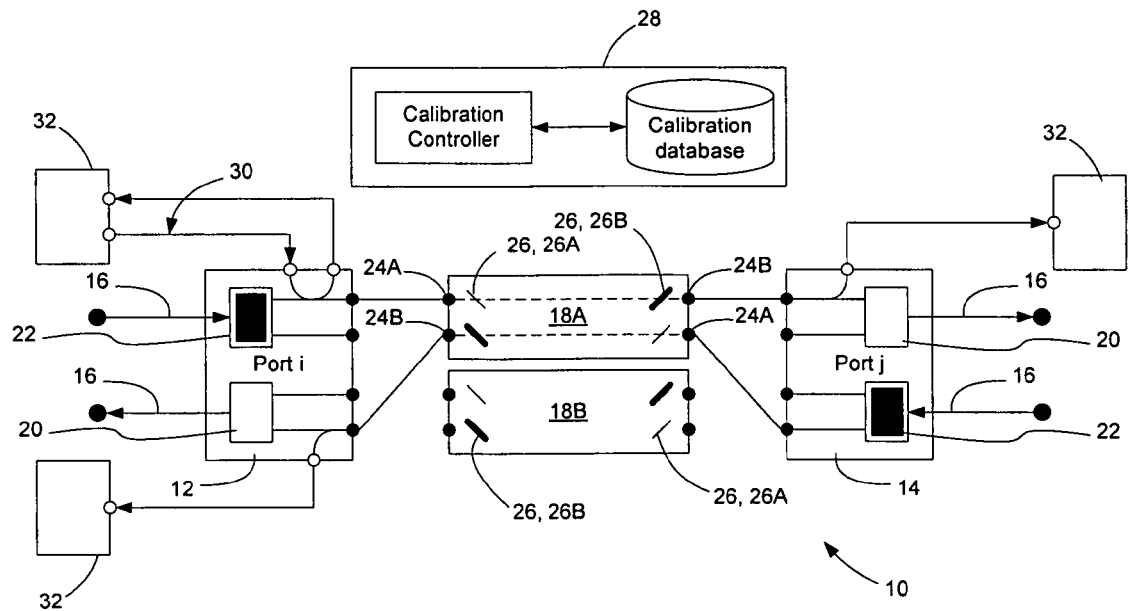
FIG. 3 is a diagrammatic illustration of a photonic crossconnect device in combination with detector modules and a calibration controller.

As noted above, photonic crossconnect devices (PXC) are generally known and comprise an optical crossconnect with no optical-electrical conversions performed in the data path of the device. The PXC 10 (FIGS. 2 and 3) is provided with input ports 12 and output ports 14. External fibers 16 are connected to the PXC ports 12, 14 to transport the optical signals that are to be switched in the PXC. Switching in the PXC 10 occurs within an optical switch core 18 (FIGS. 1–3). It is assumed that the PXC 10 is non-blocking, that is, any port 12, 14 can be cross-connected to any other port in the system. An optical switch core 18 is diagrammatically illustrated in FIGS. 1–3.

For purposes of this description, it is assumed that the PXC 10 has duplex ports. PXC duplex ports include an input port and an output port and are interconnected to other equipment via the external fibers 16.

A PXC may be configured as a redundant system. An example of a redundant configuration is shown in FIGS. 2 and 3, wherein the system is provided with two independent optical switch cores 18A and 18B and two-way switches 20 within the ports 12, 14. In an alternative configuration, there is one optical switch core, but two-way switches within the ports to achieve redundancy. Various combinations of splitters 22 and/or switches 20 may be used to achieve redundancy. An example of a configuration with splitters/switches, dual cores and internal alignment lasers 30 (from optical detector modules 32) is shown in FIG. 3.

The optical switch core 18 includes a number of switching elements 24. For each input to the optical switch core 18, there is one switching element 24A, and for each output there is one switching element 24B. The switching element 24 may comprise a collimator (not shown) and a microelectromechanical (MEMs) mirror 26 (FIG. 3) that is electrostatically controlled. It is known to tilt an input mirror 26A and an output mirror 26B in three dimensional space with respect to two orthogonal axes. Switching elements 24 work so that the two mirrors in question, 26A, 26B, point to each other so as to carry an optical signal from the input mirror 26A to the output mirror 26B.

The optical switch core 18 may be programmed using a set of parameters for each switching element 24. For example, a switching element that is based on a MEMs mirror with hinge sensors may have the following parameters associated with it: (1) geometrical coordinates for positioning the mirror in three dimensional space relative to a reference; (2) offset values for the hinge sensors; and (3) gain values for the hinge sensors. The geometrical coordinates can be recorded using hinge sensor readings. For instance, for each input switching element there may be recorded the desired sensor values for all the sensors in use so that the input switching element 24A is pointed towards a selected output switching element 24B. The same may be done for every output switching element pointing towards an input switching element. Such sets of initialization values are referred to as "Parameters of Zeroth order". Hinge sensor values may change over time as a result of drift in the offset or gain of the hinges, or as a result of a correlation between the different hinges of the same mirror. For each switching element, parameters of first and second orders may be used to capture such variations. For example, first order parameters may be related to drift in sensor offset values, while second order parameters may be related to drift in sensor gain values.

In the case of electrostatically driven mirrors with two hinge sensors, X and Y sensors, an angle of rotation of the mirror may be related to an applied voltage as follows:

$V_{x0}$: The sensor offset for the X axis when the angle of rotation is 0 degrees.

$V_{y0}$: The sensor offset for the Y axis when the angle of rotation is 0 degrees.

$\alpha$: The sensor gain for the X axis $\beta$: The sensor gain for the Y axis Where $V_x$ is the X axis sensor voltage and $V_y$ the Y axis sensor voltage, the following equations apply:

$$V_x = V_{x0} + \alpha\theta \quad (1)$$

$$V_y = V_{y0} + \beta\phi \quad (2)$$

Here, $\theta$ and $\phi$ are the angles of rotation with respect to the X and Y axes of the mirror, respectively. The equations (1) and (2) assume that a response is linear with respect to the angle of rotation, and there is no dependence on the angle of rotation with respect to the other axis. The $V_{y0}$ and $V_{x0}$ can be considered offset terms, and $\alpha$ and $\beta$ can be considered gain terms.

The equations (1) and (2) are easily modified to incorporate dependence between X and Y axes of rotation, as well as lower order terms, as follows:

$$V_x = V_{x0} + \alpha\theta + y\theta^2 + f(\theta,\phi) \quad (3)$$

$$V_y = V_{y0} + \beta\phi + \delta\phi^2 + g(\theta,\phi) \quad (4)$$

In operation, it is desired that an input mirror 26A align with an output mirror 26B. In order to accomplish this, the mirror 26A has to be turned with respect to the X axis and Y axis. Given a desired angle, a servo control for the mirrors uses the equations above to relate the sensor voltages to the desired angle.

From equation (1), it is clear that to solve for the unknowns $V_{x0}$ and $\alpha$, it is necessary to solve a system of two equations with two unknowns. Hence, it is necessary to make at least two distinct connections involving a mirror to obtain two equations. It may be desirable to use more than two connections to get more accurate values, especially for the gain parameter $\alpha$. In case of equation (4), more than two connections are necessary. The same holds true for the unknowns $V_{y0}$ and $\beta$ relative to the Y axis.

Calibration of the PXC 10 may be carried out in two phases—fine calibration and coarse calibration. Fine calibration, in turn, involves first and second orders of correction, or refinement. Coarse calibration is used to generate a rough set of values so that connections can be made reasonably quickly. For example, coarse calibration may be based on heuristics and/or mathematical formulas to obtain the geometric coordinates of the mirrors in a MEMs based PXC, with offset and gain values set at default values. A simple method is to make all possible connections and record the configurations of the input and output switching elements after successfully making every connection. For example, in a MEMs based PXC with hinge sensors, record the hinge sensor readings after each successful connection.

Coarse calibration is essentially determining initial estimates. Once this is done, the subsequent phases of calibration refine the coarse values and determine increasingly accurate values.

First order correction of calibration data can be achieved by refining the coarse calibration parameters associated with the switching elements 24. In the case of a MEMs based PXC, this involves correcting the calibration data for drift in sensor offsets. First order correction of the data for a switching element may be achieved by having the switching element participate in one connection. This is sufficient inasmuch as equation (1) or (2) is used in this case.

If the ports of the PXC are bi-directional ports, it is convenient to perform loopback connections (i.e., crossconnect the input of a port to the output of the same port) to generate data for the first order correction. A laser source is necessary to make a crossconnection. The laser source may be an external laser source (external to the PXC system) or an internal laser source that is internal to the PXC stem. In both cases, it is desirable to ensure that the light used to update calibration data does not leave the PXC system.

In the case of the redundant PXC system, as shown in FIG. 3, the two-way switches 20 at the output ports 14 of the PXC 10 are used to ensure that the light does not leave the PXC system. The following steps are preferred:

(1) ensure that the crossconnection is not active in core 18B;

(2) set the switch 20 at the output port 14 to select from core 18B;

(3) make a loopback connection in core 18A and record data for the first order corrections;

(4) tear down the loopback connection in core 18A;

(5) set switch 20 to select from core 18A; and (6) make a loopback connection in core 18B and record data for the first order corrections. First order correction may be carried out continuously for ports that are involved in crossconnections.

Figure 4:
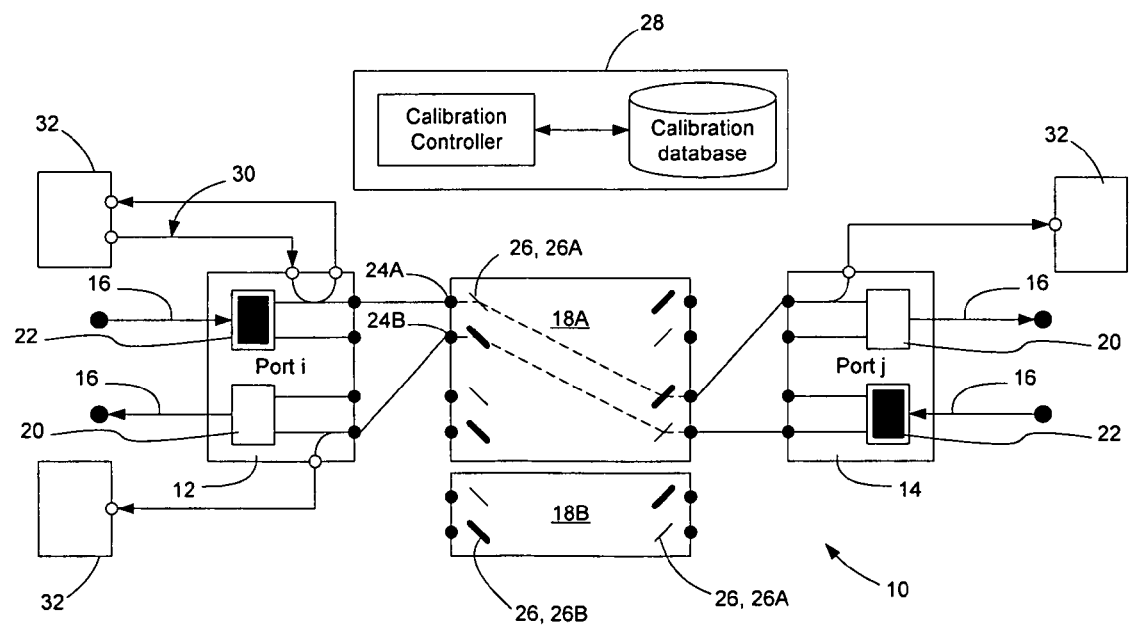
FIG. 4 is a diagrammatic illustration of a photonic crossconnect device in combination with detector modules and a calibration controller showing a second crossconnection between a first mirror and a third mirror.

Second order correction of calibration data involves refining the first order parameters. In the case of a MEMs based PXC, this involves correcting offset and gain values for the switching elements 24. As more than one parameter is being corrected, at least one additional crossconnection is required per switching element being calibrated. The additional crossconnection may be created, for example as shown in FIG. 4, by causing a crossconnection to be created between the first mirror 26A and a third mirror 26B'. Using the data from the two crossconnections, second order correction is made. It is useful to make several connections, more than two, and apply a technique such as linear regression to obtain robust values.

Ports 12, 14 in the PXC 10 may be reserved for calibration to ensure availability of free ports for the connections necessary to make second order corrections. As in the previous correction phase, one may use internal or external light for the crossconnections. One should ensure that the light does not leave the PXC system by making proper use of the switches 20 at the PXC ports 12, 14.

The above methods for updates of calibration data can be performed with the PXC in operation. It may also be performed with a partially equipped system where only some ports are deployed and some are not. The above methods require only deployed ports to participate in crossconnections. The method may be employed periodically on ports that are idle in an operational PXC system or may be employed upon user demand. The calibration data may be recorded persistently in a database within the system. The data may be copied periodically to an off-line location 28 (FIG. 3) where trends in calibration data can be studied to monitor system performance. Trend analysis can also be performed within the system controller to trigger alarms (not shown) on some optical switching elements 24 or ports 12, 14 of the system if calibration data is seen to be changing beyond expected limits.

There is thus provided a method for calibrating the switching elements of a photonic crossconnect device, thereby facilitating quick and reliable crossconnections.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A method for calibrating a preferred disposition for a moveable first mirror of an optical switch core of a photonic crossconnect device relative to a second mirror thereof, the optical switch core of the photonic crossconnect device comprising the first mirror, the second mirror, and a third mirror, the method comprising:
   effecting a laser light crossconnection between the first and second mirrors so as to produce first order correction data; and
   effecting a further laser light crossconnection between the first mirror and the third mirror so as to produce second order correction date;
   wherein detection of deviation of the first mirror from the preferred disposition thereof and implementation of corrective changes are based on the first order correction data and the second order correction data.

2. A method for calibrating a disposition for a first mirror of an optical switch core of a photonic crossconnect device relative to a second mirror of the optical switch core, the optical switch core of the photonic crossconnect device comprising the first mirror, the second mirror, and a third mirror, the first mirror being movably mounted relative to the optical switch core, and a sensor for sensing geometrical coordinates of the first mirror in space, and the sensor configured to determine offset values and gain values thereof, the method comprising the steps of:
   setting the offset values and gain values of the sensor to default values;
   determining a given position of the first mirror relative to the second mirror by at least one of (i) heuristics and (ii) mathematics
   effecting a laser light crossconnection between the first mirror and the second mirror so as to produce first order correction data related to the given position of the first mirror relative to the second mirror; and
   effecting at least one further laser light crossconnection between the first mirror and the third mirror so as to produce second order correction data related to the offset values and gain values of the sensor;
   wherein the sensor is adapted to detect deviation of the first mirror from a preferred disposition thereof that may be used to effect corrective changes upon initiation of a subsequent laser light crossconnection involving the first mirror.

3. Apparatus for calibrating a disposition for a first mirror of an optical switch core of a photonic crossconnect device relative to a second mirror of the optical switch core, the optical switch core of the phonic crossconnect device comprising the first mirror, the second mirror, and a third minor, the first mirror being movably mounted relative to the optical switch core, said apparatus comprising:
   sensor means for sensing geometrical coordinates of the first mirror in space, and the sensor means configured to determine offset values thereof and gain values thereof;
   set means for setting the offset values and gain values for the sensor means to default values, respectively;
   determination means for determining a given position of the first mirror relative to the second mirror by at least one of (i) heuristics and (ii) mathematics;
   first effector means for effecting a laser light crossconnection between the first minor and the second mirror so as to produce first order correction data related to the given position of the first mirror relative to the second mirror, and
   second effector means for effecting at least one further laser light crossconnection between the first mirror and a third mirror so as to produce second order correction data related to the offset values and the gain values of the first mirror;
   wherein the sensor means are adapted to detect deviation of the first mirror from a preferred disposition therefore and effect corrective changes upon initiation of a laser light crossconnection involving the first mirror.

4. A method for calibrating a preferred disposition for a moveable first mirror of an optical switch core of a photonic crossconnect device relative to a second mirror thereof, the method comprising the steps of determining approximate geometric coordinates of the first mirror relative to the second mirror, effecting a laser light crossconnection between the first and second mirrors to produce data from which to provide first order corrections to refine the geometric coordinates, and effecting a further laser light crossconnection between the first mirror and a third mirror, to produce data from which to provide second order corrections to further refine the geometric coordinates, whereby to calibrate the first mirror such that upon initiation of a laser light crossconnection involving the first mirror, a switching element detects deviation of the first mirror from the preferred disposition thereof and effects corrective changes.

5. A method for calibrating a disposition for a first mirror of a first switching element of an optical switch core of a photonic crossconnect device relative to a second mirror of a second switching element of the optical switch core, the first element first mirror being movably mounted relative to the optical switch core, and first switching element sensors mounted on the first switching element for sensing (i) geometrical coordinates of the first mirror in space, (ii) offset values for the first switching element sensors, and (iii) gain values for the first switching element sensors, the method comprising the steps of:

setting offset and gain values for the first switching element sensors of the first switching element to default values;

determining approximate geometric coordinates of the first mirror of the first switching element relative to the second mirror of the second switching element by at least one of (i) heuristics and (ii) mathematics;

effecting a laser light crossconnection between the switching elements' first and second mirrors to produce data from which to provide first order corrections and refine the geometrical coordinates of the first mirror of the first switching element; and effecting at least one further laser light crossconnection between the first switching element first mirror and a third switching element third mirror, to produce data from which to correct the offset and gain values for the first switching element sensors to provide second order corrections and further refine the geometrical coordinates of the first mirror;

whereby to calibrate the first mirror such that upon initiation of a laser light crossconnection involving the first mirror, the switching element sensors for the first switching element are adapted to detect deviation of the first mirror from a preferred disposition thereof and enable the first switching element to effect corrective changes.

6. Apparatus for calibrating a disposition for a first mirror of a first switching element of an optical switch core of a photonic crossconnect device relative to a second mirror of a second switching element of the optical switch core, the first element first mirror being movably mounted relative to the optical switch core, said apparatus comprising:

first switching element sensors mounted on the first switching element for sensing (i) geometrical coordinates of the first mirror in space, (ii) offset values for the first switching element sensors, and (iii) gain values for the first switching element sensors;

default setting means for setting offset and gain values for the first switching element sensors of the first switching element to default values;

approximation means for determining approximate geometric coordinates of the first mirror of the first switching element relative to the second mirror of the second switching element by at least one of (i) heuristics and (ii) mathematics;

first crossconnection means for effecting a laser light crossconnection between the switching elements' first and second mirrors to produce data from which to provide first order corrections and refine the geometrical coordinates of the first mirror of the first switching element; and second crossconnection means for effecting at least one further laser light crossconnection between the first switching element first mirror and a third switching element third mirror, to produce data from which to correct the offset and gain values for the first switching element sensors to provide second order corrections and further refine the geometrical coordinates of the first mirror;

wherein the switching element sensors fro the first switching element are adapted to detect deviation of the first mirror from a preferred disposition thereof and enable the first switching element to effect corrective changes upon initiation of a laser light crossconnection involving the first mirror so as to calibrate the first mirror.

* * * * *